United States Patent [19]

Hosokawa et al.

[11] Patent Number: 5,234,336
[45] Date of Patent: Aug. 10, 1993

[54] PRESSURE MOLDING APPARATUS FOR MOLTEN RESIN

[75] Inventors: Toshihiro Hosokawa; Kiyoshi Nakahara; Ryuichi Ishitsubo; Toshiyuki Okuda, all of Osaka, Japan

[73] Assignee: Hosokawa Seisakusho Co., Ltd., Osaka, Japan

[21] Appl. No.: 536,864

[22] Filed: Jun. 12, 1990

[30] Foreign Application Priority Data

Jun. 14, 1989 [JP] Japan ................... 1-69469[U]

[51] Int. Cl.$^5$ ........................................... B29C 45/03
[52] U.S. Cl. .................................. 425/549; 425/568
[58] Field of Search .............. 425/562, 563, 564, 577, 425/586, 549, 568, 567, 569; 264/328.15, 328.9

[56] References Cited

U.S. PATENT DOCUMENTS

| | | | |
|---|---|---|---|
| 2,308,867 | 1/1943 | Dinzl | 425/568 |
| 2,460,831 | 2/1949 | Kovacs | 264/328.15 |
| 2,462,308 | 2/1949 | Dinzl | 425/568 |
| 2,551,439 | 5/1951 | Kovacs | 264/328.15 |
| 2,567,693 | 9/1951 | Brunner | 425/568 |
| 3,606,171 | 9/1971 | Voelker | 425/569 |
| 4,106,887 | 8/1978 | Yasuike et al. | 425/549 |
| 4,260,348 | 4/1981 | Graham | 425/569 |
| 4,272,236 | 6/1981 | Rees et al. | 425/564 |
| 4,292,018 | 9/1981 | Beale | 425/549 |
| 4,330,258 | 5/1982 | Gellert | 425/564 |
| 4,378,963 | 4/1983 | Schouenberg | 425/549 |
| 4,981,431 | 1/1991 | Schmidt | 425/549 |
| 5,028,227 | 7/1991 | Gellert et al. | 425/549 |

OTHER PUBLICATIONS

"D-M-E News", vol. 44, No. 1 (1987); entire article.

Primary Examiner—Jay H. Woo
Assistant Examiner—Robert B. Davis
Attorney, Agent, or Firm—Nikaido, Marmelstein, Murray & Oram

[57] ABSTRACT

The invention provides a pressure molding apparatus for molten resin capable of efficiently maintaining the temperature of molten resin in the gate pipe, which is provided with molten-resin feeding gate pipes beneath the gate aperture of a molding unit composed of upper and lower molds in order that molten resin can be delivered to the interior of the molding unit before being pressed and molded, where the heater unit for maintaining the temperature of molten resin is disposed in the external periphery of the gate pipes in the state of being divided into two units in the vertical direction. Opposite portions of the gate pipe vertically being divided into two units are connected to each other so that length can optionally be adjusted to the extended or contracted direction, wherein the heater unit is discretely provided in the periphery of the gate pipes which are separately disposed.

2 Claims, 3 Drawing Sheets

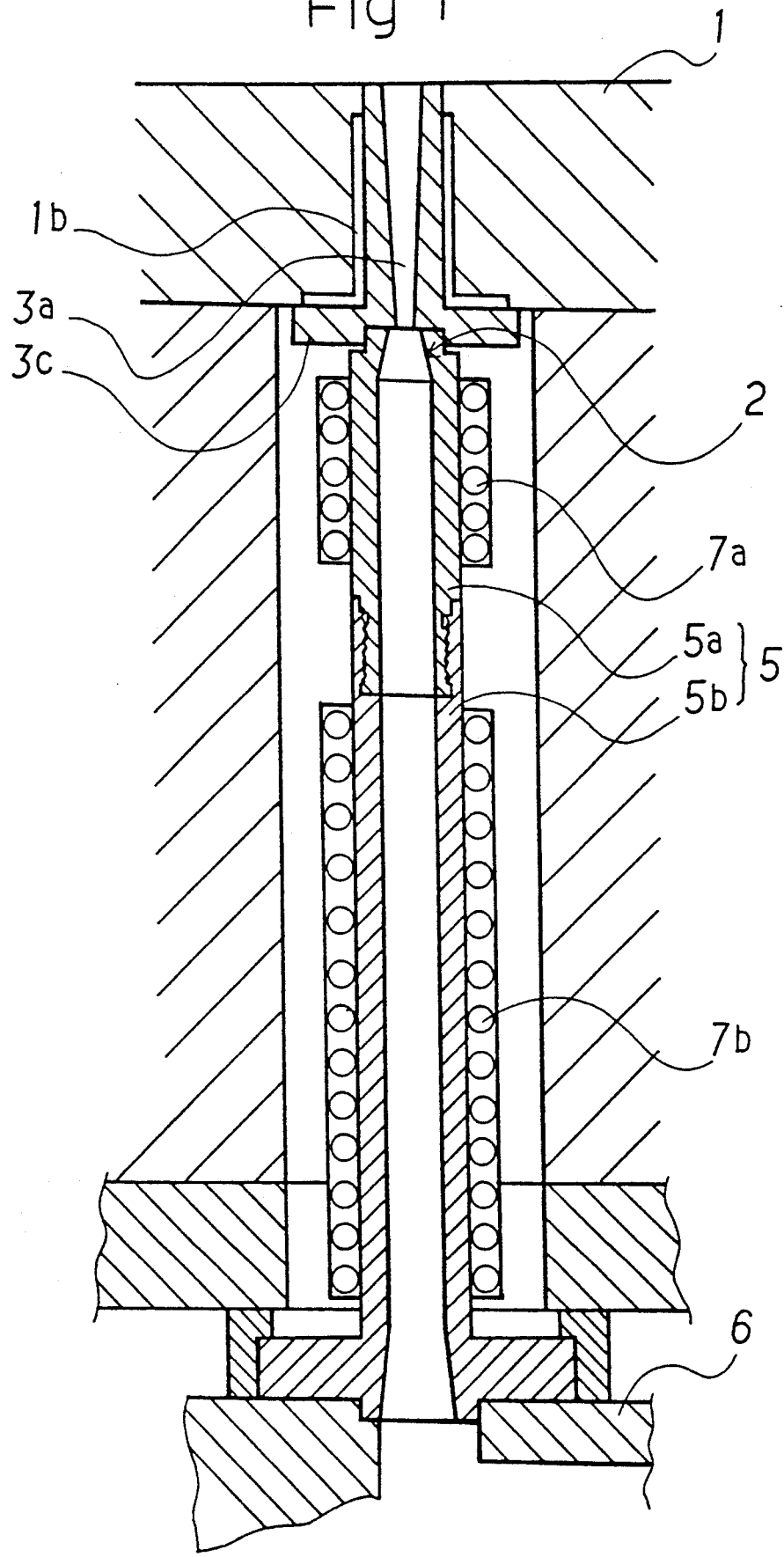

PRESSURE MOLDING APPARATUS FOR MOLTEN RESIN

FIELD OF THE INVENTION

The present invention relates to a pressure mold apparatus for molten resin in detail a structure for maintaining temperature of molten resin built inside of a molten-resin pressure molding apparatus.

The object of the invention is to provide a structure which is capable of efficiently maintaining temperature of molten resin in side of gate pipes of the pressured molding apparatus.

The invention provides an apparatus for pressure molding molten resin, which is provided with molten-resin feeding gate pipes beneath the gate aperture of the molding unit composed of upper and lower molds in order that molten resin can be delivered to the interior of the molding unit before being pressed and molded, where a heater unit for maintaining temperature of the molten resin is disposed in the external periphery of the gate pipes in the state of being divided into two units in the vertical direction.

Furthermore, opposite portions of the gate pipes vertically being divided into two units are connected to each other so that their lengths can optionally be adjusted to the extended or contracted direction, wherein the heater unit is discretely provided in the periphery of the gate pipes which are separately disposed.

Furthermore, a vertically disposed through-hole is provided through the gate portion of the molding unit composed of the upper and lower molds.

A gate spool having a gate aperture is coupled to the through-hole, where those gate pipes each having a molten-resin temperature maintaining heater are provided beneath the gate aperture of the gate spool so that the molten resin which is held in the gate pipes and heated by the heaters can be fed from the gate aperture before eventually being pressed and molded by the pressing molding apparatus, in which the molding unit is characteristically provided with an adiabatic slit at the portion where the external periphery of the gate spool and the mold body face each other.

The invention has successfully solved a variety of technical problems by providing a novel structure for maintaining temperature of molten resin inside of the molten-resin pressing and molding apparatus featuring the above structure.

BACKGROUND OF THE INVENTION

By virtue of economic advantage, the compatibility for freely shaping final goods, and light weight, molded plastic goods are widely made available for a variety of fields today in an extremely large quantity including the manufacture of automobiles and electric appliances, for example.

Conventionally, plastic goods are manufactured by applying the injection molding process.

However, in recent years, some of those skilled in the art have introduced a system for molding resin by applying such a pressure molding apparatus comprising a molding unit incorporating upper and lower molds 15 and 16 shown in FIG. 2 A though D.

More particularly, a gate pipe 20 for feeding molten resin is disposed beneath the gate aperture 19 provided for the lower mold 16 of the molding unit 17 composed of the upper and lower molds 15 and 16.

This molding unit 17 feeds molten resin 18 stored in the gate pipe 20 from the gate aperture 19 to the interior of the molding unit 17 before pressing and molding it.

DESCRIPTION OF THE PRIOR ART

Any conventional pressure molding apparatus for molten resin is provided with a serially connected heater 21 in the periphery and along the longitudinal direction of the gate pipe 20 in order to maintain the temperature of molten resin 18 stored in the gate pipe 20.

PROBLEMS TO BE SOLVED BY THE INVENTION

Nevertheless, as mentioned above, since any conventional pressure molding apparatus for molten resin is provided with such a typical structure in which a serially connected heater is disposed in the periphery and longitudinal direction of the gate pipe to maintain the temperature of molten resin stored in the gate pipe the temperature in the center portion of the longitudinal direction of the heater becomes higher than that is present at both ends of the longitudinal direction. As a result, the temperature cannot uniformly be maintained throughout the entire longitudinal direction of the gate pipe.

This in turn causes part of molten resin to be heated by a higher temperature, thus eventually resulting in the uneven quality of the molded products.

Furthermore, when operating such a conventional molding apparatus having structure in which a through-hole is vertically provided for the gate portion of the molding unit, where a gate spool having a gate aperture is coupled to this through-hole, and yet, a gate pipe incorporating a molten-resin temperature maintaining heater is peripherally provided beneath the gate aperture of the gate spool. According to the structure mentioned above, since the gate spool directly faces and remains in contact with the mold, heat generated by the heater for heating the interior of the gate pipe is conducted from the gate pipe to the gate spool and then to the mold itself, thus resulting in the poor efficiency of maintaining temperature.

Now, therefore, in order to fully solve those problems cited above, an improvement to the structure for maintaining constant temperature of molten resin in the molten-resin pressing molding apparatus capable of efficiently maintaining temperature of molten resin stored in the gate pipe has been found and is embodied in the present invention.

BRIEF DESCRIPTION OF THE DRAWING

FIG. 1 illustrates the vertical sectional view of essential components of the molten-resin heating structure of the pressure molding apparatus for molten resin reflecting an embodiment of the invention, and FIG. 2 A through 2 D respectively illustrate the vertical sectional view of conventional molten-resin heating structures.

DESCRIPTION OF THE PREFERRED EMBODIMENT

Figure 2A:
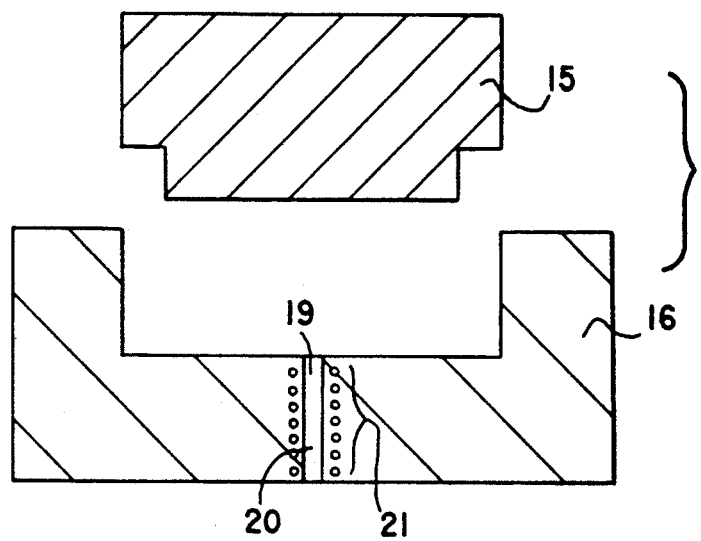
Figure 2B:
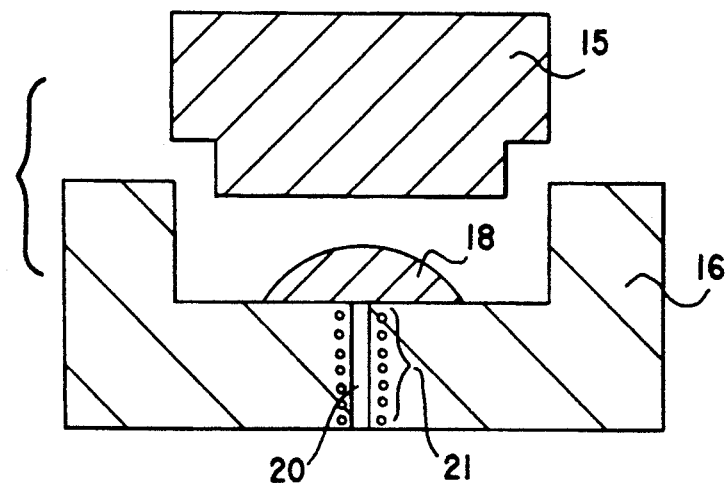
Figure 2C:
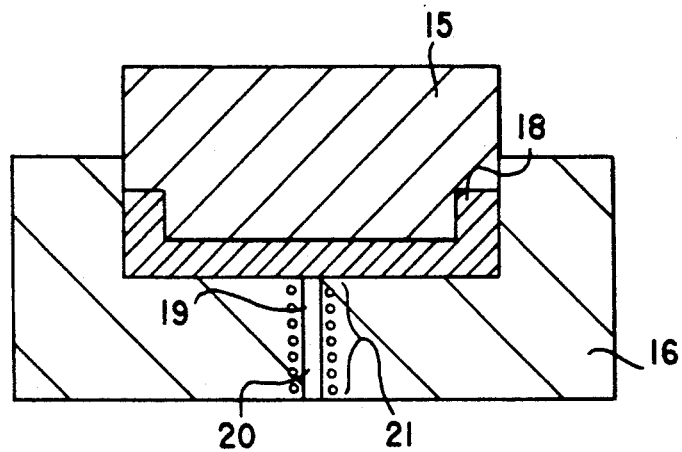
Figure 2D:
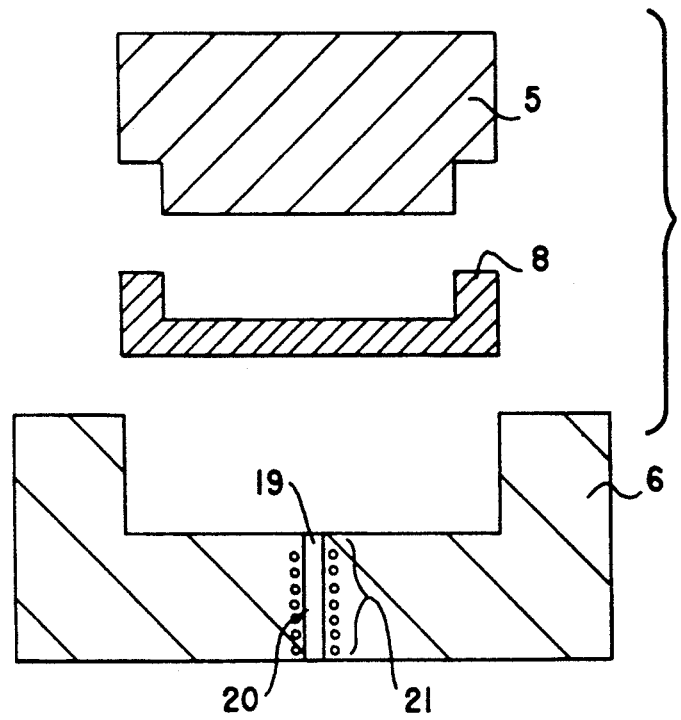

Referring now to FIG. 1, an embodiment of the molten resin temperature maintaining structure of the pressure molding apparatus for molten resin of the invention is described below.

The pressure molding apparatus for molten-resin embodied by the invention incorporates a molding unit which is composed of a lower mold 1 and an upper mold (not shown).

Gate unit 2 is installed to the predetermined position of the lower mold 1.

Gate spool 3 of the gate unit 2 is coupled to a through hole 1a which is provided for the predetermined position of the lower mold 1.

Gate aperture 3a and tapered hole 3b which has an adequate length and expands itself in the direction of the inner surface of the lower mold 1 from the gate aperture 3a are respectively provided for the gate spool 3.

Slit 1b is provided for the portion where the gate spool 3 and the lower mold 1 face each other.

More particularly, the lower mold 1 is cut at the portion where the external periphery of the gate spool 3 faces the through hole 1a of the lower mold 1, and yet, the lower mold 1 is also cut at the portion where the upper surface of collar member 3c and the bottom surface of the lower mold 1 face each other.

The slit 1b is provided at the cut position of the lower mold 1 mentioned above.

Gate pipe 5 having a minimum of 60 mm of total length is disposed beneath the gate spool 3.

The gate pipe 5 is separately composed of upper pipe 5a and lower pipe 5b.

Opposite portions of these gate pipes 5 are connected to each other by engaging male screws with corresponding female screws.

Heater 7a and 7b disposed in the vertical direction are respectively secured to the external periphery of these gate pipes 5a and 5b.

More particularly, the heater 7a is installed to the external periphery of the upper pipe 5a of the gate pipe 5 by way of surrounding the external periphery.

The other heater 7b is installed to the external periphery of the lower pipe 5b by way of surrounding the external periphery.

Not only the separation into two units, but the embodiment may also divide the gate pipe 5 into three units or more according to the length of the gate pipe 5.

It is thus desired that both heaters be respectively secured to the external periphery of the divided gate pipes 5 in accordance with the division.

Manifold tube 6 composing molten-resin supply path 6a is provided beneath the gate pipe 5.

When operating the pressure molding apparatus for molten resin incorporating the structure embodied by the invention, molten resin is supplied from the manifold tube 6 to the interior of the gate pipe 5, in which the temperature of the molten resin is maintained at the predetermined degree by the heaters 7a and 7b.

Next, the molten resin whose constant temperature is maintained inside the gate pipe 5 by the functioning of these heaters 7a and 7b is then delivered to the interior of the molding unit from the gate aperture 3a.

As mentioned above, since the heaters 7a and 7b are respectively secured to the gate pipe 5 in the vertical direction, the temperature of the molten resin inside of the gate pipe 5 is uniformly maintained by those heaters 7a and 7b throughout the entire longitudinal direction.

As a consequence, the molding structure of the invention can constantly maintain the temperature of the molten resin almost at the predetermined degree.

Furthermore, since the gate pipe 5 is separately composed of at least two units, and yet, since the length of the gate pipe 5 can optionally be adjusted for extention or contraction by means of screws secured to the opposite portions, an operator can easily adjust the length of the gate pipe 5.

Furthermore, since the adiabatic slit 1b is provided for the portion where the external periphery of the gate spool 3 faces the lower mold 1, heat generated by the heaters 7a and 7b and conducted from the gate pipe 5 to the gate spool 3 is insulated by the adiabatic slit 1b in order that heat can be prevented from being conducted to the lower mold 1.

As the result, the actual effect of maintaining the temperature of the molten resin by means of these heaters 7a and 7b can significantly be promoted.

The invention provides a pressure molding apparatus for molten resin incorporating the molten-resin-feeding gate pipes beneath the gate aperture of the molding unit composed of the upper and lower molds so that the molten resin stored in the gate pipes can be fed to the interior of the molding unit from the gate aperture before being pressed and molded.

In particular, since the invention provides two molten-resin temperature maintaining heaters which are at least vertically secured to the external periphery of the gate pipes, pressure molding apparatus for molten resin of the invention can securely achieve those advantageous effects mentioned below.

Concretely, owing to the unique structure of the gate pipes separately composed of two units in the vertical direction, and yet, since the opposite portions of these gate pipes can be extended or contracted as required, an operator can easily adjust the length.

Furthermore, the pressure molding apparatus for molten resin embodied by the invention vertically provides a through hole for the gate portion of the molding unit composed of the upper and lower molds, and yet, it engages the gate spool having the gate aperture with the through hole.

In addition, the embodied structure is provided with gate pipes which are disposed below the gate aperture of the gate spool and externally provided with heaters for maintaining the temperature of the molten resin in order that the molten resin temperature being maintained constant via these heaters can eventually be fed from the interior of the gate pipes to the molding unit via the gate aperture.

In particular, since the pressure molding apparatus for molten resin of the invention provides the adiabatic slit for the portion where the external periphery of the gate spool faces the mold surface, the apparatus can securely achieve those advantageous effects mentioned below.

Concretely, by virtue of the provision of the adiabatic slit for the portion where the external periphery of the gate spool faces the mold surface, heat generated by the pair of heaters and conducted from the gate pipes to the gate spool is insulated by the adiabatic slit so that heat can be prevented from being conducted to the mold unit, thus eventually promoting the actual effect of these heaters for maintaining temperature of the molten resin constant.

What is claimed is:

1. A pressure molding apparatus for molten resin for maintaining temperature of molten resin constant, said apparatus comprises:

molding means having an upper mold and a lower mold, for receiving the molten resin therein, said molding means being formed so as to receive the molten resin when said molding means is open;

a gate spool which has a gate aperture and is connected to a through hole of said molding means, said gate spool having a tapered hole means that is defined narrow at a gate pin end and wide at a mold cavity end, for preventing the gate aperture from being closed by resin, said gate spool further having an adiabatic slit defined and provided at an external periphery thereof facing a mold surface, the adiabatic slit being formed so as to prevent cooling caused by the molds;

a molten-resin feeding gate pipe positioned beneath and operatively connected to the gate aperture of the gate spool; and a heating means disposed on an external periphery of said gate pipe, for maintaining the temperature of molten resin constant while said molding means is closed prior to the molten resin being fed into an interior of said molding means, said heating unit including two units positioned in the vertical direction, said gate pipe including at least two sections which are disposed in the vertical direction, wherein the sections are adjustably connected in order that a length of said gate pipe can be adjusted for extension or contraction, and wherein each of said heater units is separately disposed onto the periphery of one of the sections of said gate pipe.

2. A pressure molding apparatus for molten resin, said apparatus comprises:

molding means having an upper mold and a lower mold, for receiving the molten resin therein, said molding means being formed so as to receive the molten resin when said molding means is open;

a gate portion provided in said molding unit, said gate portion having a through hole vertically defined therein;

a gate spool which has a gate aperture and is coupled to the through hole; and a pair of inter-connected gate pipes which are respectively disposed below the gate aperture and provided with a molten-resin temperature maintaining heater means on their external peripheral surfaces for maintaining molten resin stored in said gate pipes at a uniform temperature while said molding means is closed prior to being fed to the interior of said molding means for being pressed and molded, said pair of inter-connected gate pipes being adjustable in length relative to each other, said apparatus being provided with an adiabatic slit at an external periphery of said gate spool facing a mold surface, the adiabatic slit being formed so as to prevent cooling caused by the molds.

\* \* \* \* \*